1,957,770

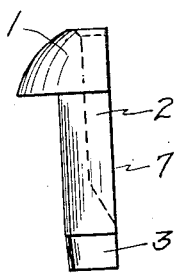
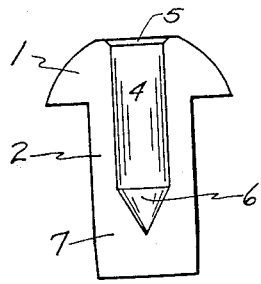
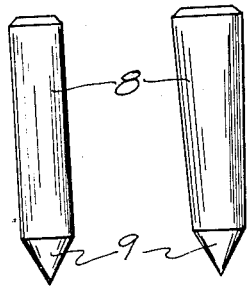
Fig.1. Fig.2. Fig.3A Fig.3B
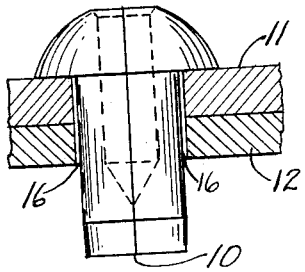
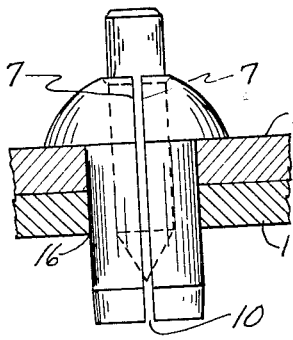
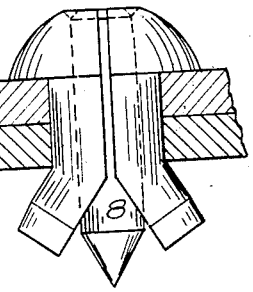
Fig.4. Fig.5. Fig.6.
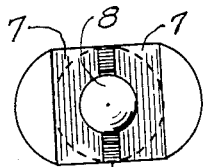
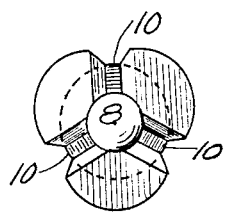
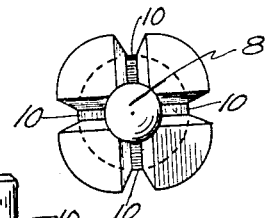
Fig.7. Fig.8. Fig.9.
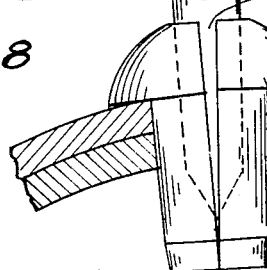
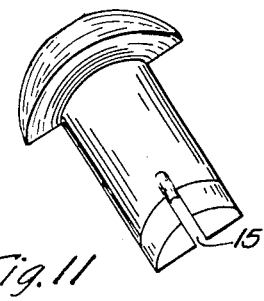
Fig.10. Fig.11.
Jonathan Roy Freeze
INVENTOR
BY Fred R. Ripfert
ATTORNEY Patented May 8, 1934

UNITED STATES PATENT OFFICE 1,957,770

FASTENING DEVICE

Jonathan Roy Freeze, Middletown, Ohio, assignor to The American Rolling Mill Company, Middletown, Ohio, a corporation of Ohio Application July 8, 1932, Serial No. 621,505

5 Claims. (Cl. 85—2)

My invention relates to rivets for fastening together metal plates and the like, whereby the rivets are driven while cold.

More particularly my invention relates to sectional expanding rivets, each rivet being composed of several identical separate parts which are assembled during the riveting operation and expanded and thereby permanently fastened by a drive pin.

One object of my invention is to provide a rivet of the character referred to which will be cheaper to manufacture than existing similar devices.

Another object of my invention is to provide a cold rivet which will be slightly but substantially smaller than the punch holes of the plates to be fastened and will be expanded by a drive pin so as to contact tightly and fill substantially completely said punch holes, the pin remaining in place as a permanent part of the rivet after being driven in.

Another object of my invention is to provide a rivet which will be self clinching, which means, it does not have to be backed during driving.

Other objects of my invention will clearly appear from the detailed description and drawing.

In the drawing:

Figures 1 and 2 are side and front views, respectively of a section of my expanding rivet, two of which sections will make up a complete rivet, together with a drive pin after its proper insertion.

Figures 3A and 3B show drive pins.

Figures 4, 5 and 6 show progressive stages in the assembling and use of my rivet, wherein the plates to be fastened are shown in cross section through the center of the punch holes.

Figures 7, 8 and 9 represent three modifications of my new and improved rivet showing how the rivet appears from below after the drive pin has been driven home, said modifications comprising sets of 2, 3 and 4 separate identical sections respectively.

Figure 10 shows another modification of my invention especially adapted to the riveting of curved plates which are shown in cross section through the center of the punch holes.

Figure 11 is another modification of my invention showing a perspective view of a rivet section which otherwise corresponds exactly to the one shown in Figures 1 and 2, however is provided at its lower end with a slit 15.

In Figures 1 and 2, 1 denotes the head of the rivet; 2, the shank; 3, the lower slightly tapered part of the shank; 4, the bore in the body of the rivet terminating in a tapered part 6. The upper part of the bore is preferably outwardly tapered at an angle of approximately 45° as shown at 5, in order to facilitate the proper insertion of the drive pin during the riveting operation. The length of the bore 4 should be so proportioned that it is slightly longer than the combined thickness of the plates to be fastened. Two of the devices shown in Figures 1 and 2 make up a hollow rivet contacting at their smooth flat faces 7.

The drive pins may be either of constant diameter except for the foremost tapered part 9, as shown in Figure 3A, or they may be tapered slightly throughout as shown in Figure 3B. If the drive pin is of constant diameter then this diameter should be preferably slightly larger than that of bore 4 of the rivet body in order to have the expanding effect desired, or the circumference of the rivet shank 2 and the circumference of the bore 4 may be in cross section slightly less than a half circle.

The advantage of such a possibility of expanding the rivet is clearly evident from Figures 4, 5 and 6 showing the rivet in progressive stages of application. In Figure 4 two halves of a rivet have been inserted into the punch holes of the two plates 11 and 12 to be joined. It is shown that the outer diameter of the shank of the assembled rivet is slightly but substantially less than the diameter of the punch holes leaving some space, 16, between the rivet and the sides of the punch holes. This facilitates the insertion of the rivet into the punch holes, which is of great importance in the joining of heavier plates because quite often the respective punch holes which are usually preformed in the plates do not precisely register in assembling the plates to form a riveted metal body.

Figure 5 shows the drive pin partly driven in. The rivet has been thereby expanded so that the faces 7 of the two rivet halves which have been contacting in Figure 4 are now separated leaving a space 10 between said faces, while the space 16 shown in Figure 4 between the rivet and the sides of the punch holes has now disappeared. This is due to the difference in the respective cross sectional areas of the drive pins and the bore.

Figure 6 shows the drive pin completely driven in whereby the part of the rivet which protrudes through the punch holes has been spread and thereby clinched, thus affording a rigid permanent joint of the two plates 11 and 12.

Figure 7 shows how the expanded rivet appears from below, 10 denoting the space between the flat faces of the rivet sections caused by the expansion of the two rivet sections by the drive pin.

Instead of making my rivet of two halves, my rivet may be also made of three or four identical sections which may be assembled into a complete rivet. In Figures 8 and 9 it is shown how such three part or four part rivets appear from below after the drive pin has been driven home and the rivet thereby clinched.

Several modifications of my sectional expanding rivet are possible. For instance, the drive pin may be made tapering over its whole length as shown in Figure 3B. This is especially desirable if curved plates have to be joined, as shown in Figure 10. In this modification the bore of the rivet halves is shown parallel while the drive pin is tapering throughout. Thereby the upper part of the rivet is spread to a greater extent than the lower part which has the desirable effect that the heads of the two rivet halves will have a better contact with the surface of the plate. Preferably the taper of the drive pin should be proportioned to the radius of the curved plates to be joined; the smaller the said radius, the greater the taper of the drive pin.

A further modification is shown in Figure 11. The rivet section shown here corresponds exactly to the one shown in Figures 1 and 2 except for a split arranged in the lower part of the shank. This arrangement may be of advantage if a two part rivet is to be used, and yet, a clinching of the rivet ends in four directions is desired.

It will be understood that the lower part of the rivet sections may be slightly tapered as shown at 3 in Figures 1 and 2 or, if desired, they may be cylindrical. Also the bore of my sectional rivet may be slightly tapered throughout instead of being cylindrical, or may be tapered in the head portion and be cylindrical in the shank portion.

I prefer to make my rivet of low carbon hot rolled rivet stock which is comparatively soft. The drive pin however, should be made of harder material for the reason that the drive pin should not suffer undesired deformation during the driving home and should be strong enough to expand the rivet to obtain the clinching effect shown in Figure 6. By having the rivet sections and the drive pin of soft and hard material respectively, the rivet sections will readily assume the shape of the punch holes of the plates in spite of any irregularities that may be present, and the bore of the rivet will shape itself without difficulty to the slightly different or varying diameter of the drive pin necessary or desirable for the reasons given herein before.

In actual practice I have successfully used the following dimensions which are given for illustrative purposes only:

Diameter of punch holes in plates_____ 11/16"
Diameter of shank of sectional rivet_____ 3/4"
Diameter of bore of sectional rivet_____ 3/8"
Diameter of cylindrical drive pin_____ 7/16"

It will be understood that these dimensions and proportions may be varied without avoiding the scope of my invention.

In order to determine how the strength of my novel rivet compares with that of standard bolts of the same diameter, the following compression tests have been made in a Riehle testing machine. Two corrugated plates of 1/4" thickness and 10" x 10" side length were fastened together by three standard bolts of 3/4" diameter and another identical set of plates, by three of my novel sectional rivets of the same diameter. Each set was then individually subjected to compression until failure occurred due to the shearing stresses thereby produced. The readings were 45290 pounds in the case of the standard bolts and 49810 pounds in the case of my sectional rivets. As shearing stresses are the most important ones leading to failure in applications such as my sectional rivets are adapted to, this test is fairly representative of the quality of my rivets as compared with that of other fastening means. Compression tests of curved corrugated plates joined into half circles by my novel rivets and standard bolts, respectively, proved my rivet as strong as bolts of the same diameter, but stronger than plates of No. 5 gauge in hinge action.

My improved rivet is relatively cheap to manufacture, for instance, by the use of an automatic forging machine so that the price of the finished assembled rivet will compare favorably with bolts of the same strength and will be much cheaper than so-called hollow rivets which are only split at the lower part. A further advantage of my sectional expanding rivet over the last named type of rivets is that it is possible to have the shank of the assembled rivet of considerably smaller diameter than the punch holes of the plates to be joined and still have a snug fit after the drive pin has been driven home, which is not possible if the upper part of the rivet is made of one piece.

The advantage of my improved rivets over bolts is obvious in applications where the lower part of the plates to be joined is inaccessible. As, in addition, the strength of my novel rivet is at least equal to that of bolts or hot rivets of approximately the same gauge, the great importance of my invention in the riveting field will be readily appreciated.

Having thus described my invention, what I claim as new and desire to secure by Letters Patent, is:

1. A fastening device for cold riveting operations comprising a rivet completely split into two identical longitudinal sections and provided with a concentric bore of circular cross section extending from the head into the shank of said rivet and terminating in a conical end, and a cylindrical pin of greater diameter than said bore adapted to be driven into said bore, thereby forcing the sections of the rivet outward and clinching their ends.

2. A fastening device for cold riveting operations comprising a rivet assembled from separate identical sections, said rivet having a concentric cone-ended bore of circular cross section extending from the head into the shank to a depth within the shank of approximately the combined thickness of the members to be fastened together, and a cylindrical pin of greater diameter than said bore adapted to be driven into said bore so as to force the sections of the rivet outward and clinch their ends.

3. A fastening device for cold riveting operations comprising a rivet assembled from separate identical sections, said rivet having a concentric cone-ended bore of cylindrical cross section extending from the head into the shank of a depth within the shank of approximately the combined thickness of the members to be fastened together, and a pin adapted to be driven into said bore so as to expand and clinch the rivet, said pin being of slightly larger diameter than the bore of the rivet.

4. A fastening device for cold riveting operations comprising a rivet assembled from separate identical sections, said rivet having a concentric cone-ended bore of cylindrical cross section extending from the head into the shank of a depth within the shank of approximately the combined thickness of the members to be fastened together, and a pin adapted to be driven into said bore so as to expand and clinch the rivet, said pin being at its fore end of approximately the same diameter as the bore of the rivet and thence tapering outwardly.

5. A fastening device for cold riveting operations comprising a rivet completely split into two identical longitudinal sections and provided with a concentric bore of cylindrical cross section extending from the head into the shank of said rivet and terminating in a conical end, and a pin of cylindrical cross section and of diameter larger than said bore adapted to be driven into said bore, thereby expanding and clinching the rivet, each section being of such shape that a cross section through the shank and bore defines a peripheral line of less than a half circle.

JONATHAN ROY FREEZE.